United States Patent [19]

Saiga et al.

[11] Patent Number: 5,018,679
[45] Date of Patent: May 28, 1991

[54] MAGNETIC RECORDING MEDIUM WIND-UP METHOD

[75] Inventors: Yoshiharu Saiga; Makoto Yoshimura; Susumu Hara, all of Kanagawa, Japan

[73] Assignee: Fuji Photo Film Co., Ltd., Kanagawa, Japan

[21] Appl. No.: 466,567

[22] Filed: Jan. 17, 1990

[30] Foreign Application Priority Data

Jan. 19, 1989 [JP] Japan .................................... 1-10440

[51] Int. Cl.$^5$ ............................................. B65H 18/26
[52] U.S. Cl. ................................................. 242/67.1 R
[58] Field of Search ................... 242/67.1 R, 67.2, 66, 242/65, 56 R, 56 A

[56] References Cited

U.S. PATENT DOCUMENTS

| | | | |
|---|---|---|---|
| 3,096,948 | 7/1963 | Conrad | 242/67.1 R |
| 3,393,105 | 7/1968 | Tellier | 242/66 |
| 3,853,279 | 12/1974 | Gerstein | 242/56 A X |
| 4,422,588 | 12/1983 | Nowisch | 242/66 X |
| 4,572,451 | 2/1986 | Ikeda et al. | 242/66 X |
| 4,601,441 | 7/1986 | Oinonen et al. | 242/66 X |

*Primary Examiner*—John M. Jillions
*Attorney, Agent, or Firm*—Sughrue, Mion, Zinn, Macpeak & Seas

[57] ABSTRACT

A magnetic recording medium wind-up method for winding up a long strip-like magnetic recording medium into a coil around a core comprises the steps of pressing the wound-up portion of the magnetic recording medium toward the core with a predetermined pressure while the magnetic recording medium is being wound up around the core. A predetermined length of the magnetic recording medium is wetted, which length will be wound up around the core immediately before the core is fully loaded with the magnetic recording medium, immediately before the predetermined length of the magnetic recording medium is wound up.

5 Claims, 1 Drawing Sheet

MAGNETIC RECORDING MEDIUM WIND-UP METHOD

BACKGROUND OF THE INVENTION

1. Field of the Invention

This invention relates to a magnetic recording medium wind-up method wherein a long strip-like magnetic recording medium is wound up into a coil around a core.

2. Description of the Prior Art

In general, when magnetic tapes or the like are manufactured, a magnetic layer and, when necessary, a backing layer are overlaid on a flexible plastic film 10 base, which has a wide width and which is fed from a film base roll, and are then dried in order to form a long strip-like magnetic recording medium having a wide width. Thereafter, at least the surface of the magnetic layer is calendered and made very smooth, and the long strip-like magnetic recording medium with the wide width is slit into long strip-like magnetic recording media having desired narrow widths. After the magnetic layer is overlaid on the flexible plastic film base and dried, the resulting long strip-like magnetic recording medium with the wide width is wound up around a core. Alternatively, after the long strip-like wide-width magnetic recording medium is slit into long strip-like magnetic recording media having desired narrow widths, each of the long strip-like narrow-width magnetic recording media is wound up around a core. In general, the long strip-like wide-width magnetic recording medium or the long strip-like narrow-width magnetic recording media are not cut into short lengths, but are processed with a length approximately equal to the length of the flexible plastic film base which was wound up around the film base feed roll, until they are wound up into final products such as magnetic tape cassettes. Therefore, the wind-up operation is carried out for long magnetic recording media.

In cases where the magnetic recording medium which is to be wound up around a core is long, when the magnetic recording medium is being wound up into a coil around the core, the position of loops of the magnetic recording medium can easily deviate so that the shape of the coil resembles a bamboo shoot along the axial direction of the core. In order to eliminate this problem, long magnetic recording media have heretofore been wound up while being pressed toward the core by a press roll or the like.

However, when a magnetic recording medium is moved quickly in the course of being wound up, the amount of air trapped by the moving magnetic recording medium in the space between the loops of the magnetic recording medium in the coil increases. The entrapped air causes the position of the loops of the magnetic recording medium in the coil to deviate along the axial direction of the core. Also, in cases where the coating, drying, calendering, and wind-up processes are carried out continuously in an on-line mode, or in cases where the coating, drying, calendering, slitting, and wind-up processes are carried out continuously in an on-line mode, the problem with regard to the deviation of the position of the loops of the magnetic recording medium occurs easily. This is because the $\mu$ value of the magnetic recording medium decreases and the magnetic recording medium slips more easily than when a first wind-up process is carried out after the coating and drying processes and a second wind-up process is carried out after the calendering and slitting processes.

In order to prevent the deviation of the loops of the magnetic recording medium in the coil along the axial direction of the core from being caused by an increase in the speed at which the magnetic recording medium moves during the wind-up process, or by a decrease in the $\mu$ value of the magnetic recording medium, it has been suggested that the pressing force applied to the wound-up portion of the magnetic recording medium be increased while it is being wound up. However, if the pressing force applied to the wound-up portion of the magnetic recording medium is increased while it is being wound up, the inner part of the coil, into which the magnetic recording medium has been wound up, will deform due to unevenness of the winding surface and/or due to overly tight winding. Therefore, the resulting coil of the magnetic recording medium will be of poor quality. If the pressing force applied to the wound-up portion of the magnetic recording medium during the wind-up operation is decreased until the inner part of the coil of the magnetic recording medium does not deform, the outer loops in the coil into which the magnetic recording medium is being wound become slack. Therefore, the loops of the magnetic recording medium in the coil deviate easily, and the coil takes on a shape resembling a bamboo shoot while the magnetic recording medium is being wound up or while the wind-up operation is being slowed down.

SUMMARY OF THE INVENTION

The primary object of the present invention is to provide a magnetic recording medium wind-up method wherein, even when a magnetic recording medium which has a high surface smoothness and which slips easily is quickly wound up into a coil around a core, the positions of loops of the magnetic recording medium in the coil are prevented from deviating and the coil is prevented from taking on a shape resembling a bamboo shoot.

Another object of the present invention is to provide a magnetic recording medium wind-up method wherein even a magnetic recording medium which has a high surface smoothness and which slips easily can be quickly wound up into a coil free of any deformation and having good quality.

The aforesaid objects are accomplished with a magnetic recording medium wind-up method in accordance with the present invention wherein a pressing force applied to the wound-up portion of a magnetic recording medium as the magnetic recording medium is being wound up into a coil around a core is set to a level at which no deformation arises in the coil of the magnetic recording medium and at which the resulting coil will be of good quality, and wherein a predetermined length of the magnetic recording medium, which length it has been predicted will be wound up into outer loops of the coil, which loops could easily deviate along the axial direction of the core, is wetted immediately before the predetermined length of the magnetic recording medium is wound up. When the predetermined length of the magnetic recording medium, which length it has been predicted will be wound up into outer loops of the coil, is wetted and then wound up into the outer loops of the coil, the outer loops of the magnetic recording medium are superposed one upon another so that they are in close contact with one another.

Specifically, the present invention provides a magnetic recording medium wind-up method for winding up a long strip-like magnetic recording medium into a coil around a core, wherein the improvement comprises the steps of:

(i) pressing a wound-up portion of said magnetic recording medium toward said core with a predetermined pressure as said magnetic recording medium is being wound up around said core, and (ii) wetting a predetermined length of said magnetic recording medium, which length will be wound up around said core immediately before said core is fully loaded with said magnetic recording medium, immediately before the predetermined length of said magnetic recording medium is wound up.

The term "predetermined pressure" as used herein means one of various levels of pressure which will not cause any deformation to occur in the coil of the magnetic recording medium, i.e. which will not cause any problem to occur with regard to the quality of the coil of the magnetic recording medium, and which will ensure that at least the inner loops of the coil of the magnetic recording medium, which loops were not wetted, will not deviate along the axial direction of the core.

The term "predetermined length" as used herein means one of various lengths which will allow the outer loops of the magnetic recording medium superposed one upon another in the coil to be kept in close contact with one another so that the outer loops are prevented from deviating along the axial direction of the core.

Also, the term "wetting" as used herein means one of various types of wetting which will allow the outer loops of the magnetic recording medium superposed one upon another in the coil to be kept in close contact with one another so that the outer loops are prevented from deviating along the axial direction of the core. For example, in order to carry out the wetting, a liquid such as water may be applied with a spraying operation, a brushing operation, or the like, to the predetermined length of the magnetic recording medium, which length will be wound up around the core immediately before the core is fully loaded with the magnetic recording medium.

With the magnetic recording medium wind-up method in accordance with the present invention, a long strip-like magnetic recording medium is wound up around a core while the wound-up portion of the magnetic recording medium is being pressed with a predetermined pressure toward the core. Therefore, no deformation will occur in the coil into which the magnetic recording medium is being wound up. (For example, deformation due to unevenness of the surface of the magnetic recording medium and/or due to overly tight winding does not occur.) Also, at least the inner loops of the coil of the magnetic recording medium, which loops were not wetted, do not deviate along the axial direction of the core. Additionally, a predetermined length of the magnetic recording medium, which length will be wound up around the core immediately before the core is fully loaded with the magnetic recording medium, is wetted immediately before the predetermined length of the magnetic recording medium is wound up. Therefore, the outer loops of the coil of the magnetic recording medium, which are superposed one upon another, can be kept in close contact with one another. Accordingly, although the outer loops of the magnetic recording medium are not substantially prevented from deviating in position by the pressure put on the wound-up portion of the magnetic recording medium, it is still possible to prevent the loops from deviating along the axial direction of the core.

As described above, with the magnetic recording medium wind-up method in accordance with the present invention, even when a magnetic recording medium which has a high surface smoothness and which slips easily is quickly wound up into a coil around a core, the loops of the coil of the magnetic recording medium are prevented from deviating in position and the coil is prevented from taking on a shape resembling a bamboo shoot. Also, even a magnetic recording medium, which has a high surface smoothness and which slips easily, can be quickly wound up into a coil free of any deformation and having good quality. Therefore, the productivity of the magnetic recording medium can be kept high.

It may be difficult to utilize the wetted portion of the magnetic recording medium to record or reproduce information. In such cases, the wetting may be carried out on portions of the long strip-like magnetic recording medium which are present on both sides of joints which are inevitably formed at predetermined intervals in the process of manufacturing the long strip-like magnetic recording medium. In this manner, loss from the process can be minimized.

DESCRIPTION OF THE PREFERRED EMBODIMENTS

The present invention will hereinbelow be described in further detail with reference to the accompanying drawings.

Figure 1:
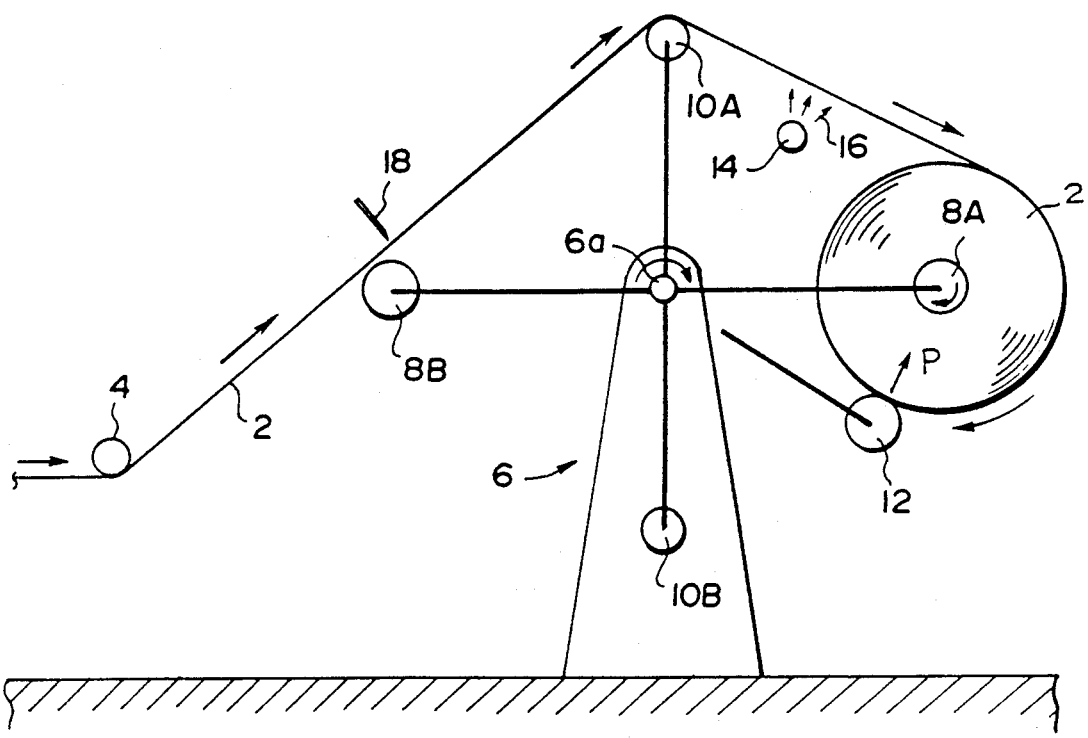
FIG. 1 is a schematic side view showing an apparatus for carrying out an embodiment of the magnetic recording medium wind-up method in accordance with the present invention.

With reference to FIG. 1, a wide-width magnetic recording medium 2 is threaded over a pass roll 4 and guided into a wind-up process. The magnetic recording medium 2 results from an operation wherein a magnetic layer is overlaid on the surface of a flexible plastic film base fed from a film base feed roll (not shown), dried, calendered, and thereafter immediately wound up. These processes are carried out in the on-line mode.

The material, thickness, width, and length of the flexible plastic film base are as specified below.
Material: Polyethylene terephthalate
Thickness: 15μm
Width: 600 mm
  Length: 8,000 m The major constituents and the surface roughness of the magnetic layer, and the surface roughness of a backing layer overlaid on the flexible plastic film base are as specified below.

|  | Parts by weight |
|---|---|
| (1) Magnetic layer (Magnetic composition) |  |
| Magnetic grains: Co-containing $FeO_x$ ($x = 1.45$) | 300 |
| Polyester polyurethane | 31 |

| | Parts by weight |
|---|---|
| Alkyd resin modified with synthetic non-drying oil | 14.5 |
| Silicone oil | 2.1 |
| Isocyanate compound | 18 |
| Butyl acetate | 800 |
| Methyl ethyl ketone | 400 |

(Final surface roughness)
Ra = 0.02 μm (cut-off value: 0.25 mm)
(2) Backing layer
(Final surface roughness)
Ra = 0.025 μm (cut-off value: 0.25 mm)

In the wind-up apparatus of FIG. 1, a turret 6 intermittently rotates by an angle of 180° around a rotation shaft 6a. A pair of cores 8A and 8B are supported on the rotation shaft 6a and are located facing each other, with the rotation shaft 6a intervening therebetween. The magnetic recording medium 2 is wound up around one of the cores 8A and 8B. After one of the cores 8A and 8B is fully loaded with the magnetic recording medium 2, the magnetic recording medium 2 is wound up around the other of the cores 8A and 8B. Reference numerals 10A and 10B represent a pair of pass rolls which are supported on the rotation shaft 6a and are rotated intermittently together with the cores 8A and 8B. FIG. 1 shows a state in which the medium 2 is threaded over the pass roll 10A and is being wound up around the core 8A. Before this state was entered, wind-up of the magnetic recording medium 2 around the core 8A was begun where the core 8B is now located in FIG. 1. After some length of the magnetic recording medium 2 had been wound up around the core 8A, the turret 6 was rotated by an angle of 180°, which caused the core 8A to become located in the position shown in FIG. 1. The winding-up of the magnetic recording medium 2 around the core 8A was then continued. The rate at which the magnetic recording medium 2 is wound up around the core 8A is 350 m/minute, and the tension on the magnetic recording medium 2 during the winding-up is 3 kg/m.

A press roll 12 is located such that it is in contact with the outer loop of the magnetic recording medium 2 which is being wound up into a coil around the core 8A. The press roll 12 presses the wound-up portion of the magnetic recording medium 2 toward the core 8A with a predetermined pressure P. The pressure placed on the magnetic recording medium 2 by the press roll 12 continues from the time when the winding-up of the magnetic recording medium 2 around the core 8A is begun to when the winding-up of the magnetic recording medium 2 around the core 8A is completed. The predetermined pressure P is set such that no deformation will occur in the coil of the magnetic recording medium 2 which is already wound up around the core 8A due to unevenness of the winding surface of the magnetic recording medium 2 and/or due to overly tight winding, and such that at least the inner loops of the magnetic recording medium 2 in the coil do not deviate along the axial direction of the core 8A. Specifically, the predetermined pressure P is set to a value satisfying the condition 10 kg/m ≦ p ≦ 100 kg/m.

A water spray nozzle 14, which is capable of spraying water 16 to the rear surface of a portion of the magnetic recording medium 2 between the core 8A and the pass roll 10A, is located between the core 8A and the pass roll 10A. The water spray nozzle 14 sprays water 16 to and wets a predetermined length of the magnetic recording medium 2, which length will be wound up around the core 8A immediately before the core 8A is fully loaded with the magnetic recording medium 2, that is, immediately before the predetermined length of the magnetic recording medium 2 is wound up. The predetermined length of the magnetic recording medium 2 thus wetted constitutes the outer loops of the coil of the magnetic recording medium 2 which has been wound up around the core 8A.

Figure 2A:
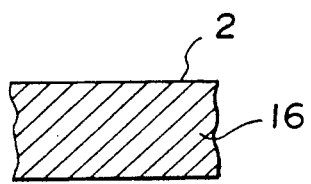
FIGS. 2A, 2B, 2C, and 2D are schematic views showing the patterns of water sprayed from a water spray nozzle in the embodiment of FIG. 1.
Figure 2B:
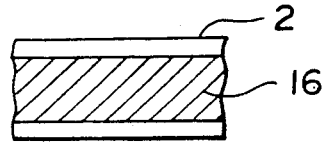
Figure 2C:
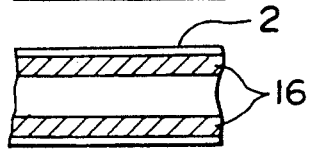
Figure 2D:
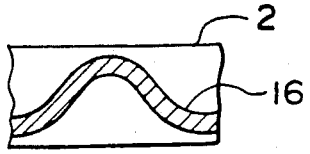

The water is sprayed from the water spraying nozzle 14 at a rate falling within the range of 1 cc/m² to 15 cc/m². The predetermined length of the magnetic recording medium 2 which is wetted falls within the range of 1 m to 100 m. The rate at which the water is sprayed and the predetermined length of the magnetic recording medium 2 which is wetted are set to values such that the outer loops of the magnetic recording medium 2, which are superposed one upon another in the coil into which the magnetic recording medium 2 has been wound, can be kept in close contact with one another and be prevented from deviating along the axial direction of the core. As shown in FIG. 2A, the water 16 sprayed from the water spraying nozzle 14 may be spread over the whole width of the magnetic recording medium 2. Alternatively, as shown in FIGS. 2B and 2C, the water 16 sprayed from the water spraying nozzle 14 may be spread over part of the width of the magnetic recording medium 2. As another alternative, as shown in FIG. 2D, the water 16 sprayed from the water spraying nozzle 14 may be sprayed in a wave pattern.

A judgment as to whether or not the core 8A has been fully loaded with the magnetic recording medium 2 is made on the basis of the length of the magnetic recording medium 2 which has been wound up around the core 8A. Specifically, a length of the magnetic recording medium 2 approximately equal to the length of the flexible plastic film base, which was wound around the film base feed roll, is fed into the wind-up process. The flexible plastic film base, which was wound around the film base feed roll, comprises predetermined lengths of the plastic film which were joined together. Parts of the magnetic recording medium on either side of joints, each of which is located between adjacent predetermined lengths of the flexible plastic film base, cannot be utilized to record or reproduce information. Therefore, no magnetic layer is overlaid on such parts of the flexible plastic film base. Accordingly, the length of the magnetic recording medium 2 which is wound up around the core 8A is an integral multiple of the length of each portion of the magnetic recording medium 2 extending between the joints. More specifically, the length of the magnetic recording medium 2 wound up around the core 8A is set to 8,000 m. Also, the parts of the magnetic recording medium 2 on either side of each joint pass over a position in the vicinity of the water spray nozzle 14 immediately before the core 8A is fully loaded with the magnetic recording medium 2. Therefore, parts on either side of each joint are wetted with water sprayed from the water spray nozzle 14. That is, the wetted parts of the magnetic recording medium 2, which parts cannot be utilized to record or reproduce information, coincide with the parts which are inevitably formed on both sides of each joint and which cannot be utilized to record or reproduce information. Accordingly, loss in the process can be minimized.

When the core 8A is approximately fully loaded with the magnetic recording medium 2, the magnetic recording medium 2 is cut by a cutter 18 which is located in the vicinity of the core 8B. The portion of the magnetic recording medium 2, which is present on the side downstream from the cutter 18 is wound up around the core 8A. As a result, the core 8A is fully loaded with the magnetic recording medium 2. The portion of the magnetic recording medium 2, which is present on the side upstream from the cutter 18, is wound up around the core 8B. The coil of the magnetic recording medium 2 which has been wound up around the core 8A is removed from the core 8A. After a certain length of the magnetic recording medium 2 is wound around the core 8B, the turret 6 rotates by an angle of 180° in order to move the core 8B to the position where the core 8A is shown in FIG. 1, and the magnetic recording medium 2 is wound up around the core 8B when it is located in this position. Thereafter, the aforesaid wind-up operation is repeated.

As described above, with this embodiment, even when a magnetic recording medium 2 which has a high surface smoothness and which slips easily is quickly wound up into a coil around a core, the positions of the loops of the magnetic recording medium 2 in the coil are prevented from deviating, and the coil is prevented from taking on a shape resembling a bamboo shoot. Also, even a magnetic recording medium 2, which has a high surface smoothness and which slips easily, can be quickly wound up into a coil free of any deformation and having good quality. Therefore, the productivity of the magnetic recording medium can be kept high. Additionally, the magnetic recording medium wind-up method in accordance with the present invention is efficient because losses in the wind-up process are minimized.

We claim:
1. A magnetic recording medium wind-up method for winding up a long strip-like magnetic recording medium into a coil around a core, wherein the improvement comprises the steps of:
(i) pressing a wound-up portion of said magnetic recording medium toward said core with a predetermined pressure while said magnetic recording medium is being would up around said core, controlling said predetermined pressure so that no deformation occurs in the wound-up portion of said magnetic recording medium and said wound-up portion of said magnetic recording medium does not deviate along an axial direction of said core, and
(ii) wetting a predetermined length of said magnetic recording medium, which length will be wound up around said core immediately before said core is fully loaded with said magnetic recording medium, and controlling said predetermined length so that a plurality of outer loops of said magnetic recording medium superposed one upon another in the said coil to be kept in close contact with one another are prevented from deviating along said axial direction of said core.

2. A method as defined in claim 1 wherein said wetting is carried out on portions of said magnetic recording medium which are present on either side of joints which are inevitably formed at predetermined intervals in a process for manufacturing said magnetic recording medium.

3. A method as defined in claim 1 wherein said predetermined pressure falls within the range of 10 kg/m to 100 kg/m.

4. A method as defined in claim 1 wherein the predetermined length of said magnetic recording medium is wetted with a liquid sprayed at a rate falling within the range of 1 cc/m$^2$ to 15 cc/m$^2$.

5. A method as defined in claim 1 wherein said predetermined length of said magnetic recording medium falls within the range of 1 m to 100 m.

* * * * *